United States Patent

[11] 3,620,908

[72] Inventors Ronald H. Dahms
    Springfield;
    George J. Anderson, Wilbraham, both of Mass.
[21] Appl. No. 738,794
[22] Filed June 21, 1968
[45] Patented Nov. 16, 1971
[73] Assignee Monsanto Company
    St. Louis, Mo.

[54] COLD PUNCHABLE CRESYLIC LAMINATES
    7 Claims, No Drawings
[52] U.S. Cl.................................. 161/248,
    117/76 P, 117/76 T, 156/334, 156/315, 156/335,
    161/250, 161/251, 161/255, 161/258, 161/264,
    260/845, 260/846
[51] Int. Cl.................................. B32b 27/10,
    B32b 27/30, B32b 27/42
[50] Field of Search.............................. 156/335,
    315, 334; 161/250, 248, 251, 255, 264, 257, 258,
    259; 260/838, 845, 846; 117/76 P, 76 T

[56] References Cited
    UNITED STATES PATENTS
2,684,351  7/1954  Williams...................... 161/250 X
2,833,684  5/1958  Horowitz..................... 161/251 X
2,834,745  5/1958  Weber........................ 156/335
2,890,148  6/1959  Dede......................... 161/251 X
2,902,458  9/1959  Teppema..................... 161/250 X
3,084,085  4/1963  Ronay........................ 161/85 X
3,331,730  7/1967  Bean et al................... 161/257 X
3,484,338  12/1969 Britton et al................ 161/251 X
    FOREIGN PATENTS
706,101   3/1954  Great Britain................ 161/264

Primary Examiner—John T. Goolkasian
Assistant Examiner—C. B. Cosby
Attorneys—John W. Klooster, Arthur E. Hoffman and H. B. Roberts ABSTRACT: Impregnated cellulosic sheets and laminates which are cold punchable and have good electrical properties. The sheets are formed of cellulosic fibers impregnated with a mixture of a carboxylated alkadiene interpolymer and a low molecular weight phenol-formaldehyde resin and then over treated with a cresol-formaldehyde resin. The laminates are made from suitably advanced such impregnated sheets by first stacking and thermosetting under appropriate heat and pressure.

COLD PUNCHABLE CRESYLIC LAMINATES

BACKGROUND

In the art of making cellulosic sheets and laminates thereof which are impregnated with phenol-aldehyde resins, it has long been appreciated that, while such constructions can be prepared so as to have good electrical properties, it has generally not heretofore been possible to make such constructions so as to have both good electrical properties and cold punchability. In addition to both properties, such constructions should have relatively good water-absorption characteristics, flexural strength characteristics, and cold flow characteristics.

Cold punchable cellulosic laminates having good electrical properties (e.g. low-dielectric constants and low-dissipation factors) find use in electrical applications as support or as insulation members for conductive elements. Such laminates are generally used in a sheet or block from which is then punched or otherwise machined to provide a particular desired configuration for individual use situations. Heretofore, in order to obtain good electrical properties, paper or other cellulosic sheetlike substrate member in nonwoven or woven form was generally first impregnated with a phenolic resin and then the resulting member was overtreated with a different phenolic resin, the second resin being chosen for its thermoset properties. However, laminate constructions made from sheets so impregnated suffer from a number of undesirable properties, and typically do not have both the properties of cold punchability and good electrical properties in combination with commercially acceptable levels for other properties.

It has now been discovered that a cellulosic substrate, especially one with a low ash content, which has been first impregnated with a combination of low-molecular weight phenol-formaldehyde resole resins, and carboxylated alkadiene interpolymer and then impregnated with a certain cresol-phenol-formaldehyde resole resin (without plasticizer) to make sheetlike members is especially well adapted for use in the manufacture of laminates having a surprising and unexpectedly superior combination of excellent cold punchability characteristics and electrical properties.

SUMMARY

The invention is directed to cold punchable, good electrical property laminates made from certain polymer impregnated cellulosic substrates in sheetlike form, to such impregnated substrates themselves, and to methods for making such substrates and such laminates.

The laminates of this invention, in addition to being cold punchable, are generally characterized by having good water-absorption characteristics, good flexural strength characteristics good cold flow characteristics, and especially both good electrical dielectric constants and good dissipation factors.

For purposes of this invention, cold punchability is conveniently measured using ASTM Test No. D617; water absorption, using ASTM Test No O-229; flexural strength, using ASTM Test No. D-790; cold flow (or deformation under load), using ASTM Test No. D-621; dielectric constants, using ASTM Test No. D-150; and dissipation factors, using ASTM Test No. D-150. Typical values for cold punchability range from about 75 to 95; for water absorption, from about 0.5 to 0.9; for flexural strength, from about 15,000 to 16,000; for cold flow, from about 0.9 to 1.2 (50° C., 4,000 p.s.i. after humidity aging); for dielectric constants, from about 4.3 to 4.6; and for dissipation factors, from about 0.037 to 0.041. Those skilled in the art will appreciate that an individual laminate of this invention may not have all properties above indicated with values within the ranges indicated; the above are general characterizations only.

In accordance with the present invention, there is an intermediate sheetlike member adapted for use in the manufacture of cold punchable laminates. This sheet member employs a substrate comprising cellulosic fibers arranged into a generally integral sheet like form. This is first impregnated with a first composition comprising (dry weight basis) from about 35 to 65 weight percent of a water-soluble phenol-formaldehyde resole resin and the balance up to 100 weight percent of such first composition being a carboxylated alkadiene interpolymer such that the resulting first-impregnated substrate contains from about 5 to 40 weight percent of said first composition (dry weight basis). The resulting so-first-impregnated substrate is next secondly impregnated with a second composition comprising a substituted phenol-formaldehyde resole resin such that the resulting so-secondly impregnated substrate contains from about 30 to 60 weight percent of said second composition (dry weight basis).

To produce such an intermediate sheet member, one employs when first impregnating a first composition comprising from about 5 to 40 weight percent (total composition basis) of a mixture comprising a first dissolved water soluble phenol-formaldehyde resole resin and an aqueous phase colloidially dispersed carboxylated alkadiene interpolymer, from about 5 to 100 weight percent water, and the balance up to 100 weight percent of any given first composition being an organic liquid which 1. is substantially inert
2. evaporates below about 150° C., at atmospheric pressures and
3. is a mutual solvent for said first resole resins. Such mixture (as indicated above) comprises (dry weight basis) from about 35 to 65 weight percent of said first resole resin and the balance up to 100 weight percent of a given mixture being said carboxylated alkadiene interpolymer.

One impregnates such substrate with such first composition to an extent such that the resulting so impregnated substrate contains from about 5 to 40 weight percent of said first composition (dry weight basis).

The first dissolved water-soluble phenol-aldehyde resole resin used in the present invention is well known to those skilled in the art. It has a formaldehyde to phenol mol ratio of from about 0.9 to 2.5. It is conveniently separately produced by reacting under aqueous liquid phase conditions phenol with formaldehyde preferably in the presence of a basic (preferably organic) catalyst to produce a solution containing phenol-formaldehyde resinous condensation product. Such resins having a low molecular weight are preferred, especially those which can be prepared in the form of at least a 55 weight percent aqueous solution. Such a resin solution characteristically has a water dilutability of at least 1:1, and preferably of at least about 8:1. In addition, this resin has a free formaldehyde content which is less than about 5 weight percent. Preferably, the phenol-formaldehyde mol ratio in this resin ranges from about 1½ to 2. An organic basic catalyst is preferably used in preparation as indicated so as to produce a resole resin product which will not contain free ions which might conduct an electrical charge after the resin has been thermoset. Suitable organic basic catalysts are well known to the art; examples include triethylamine, hexa-methylenetetramine, and the like.

The carboxylated alkadiene interpolymer used in the preparation of the laminate constructions of this invention is one which is conveniently separately prepared as an aqueous phase colloidially dispersed material in the form of a latex in water. Suitable carboxylated alkadiene interpolymers are prepared by polymerizing a monomer mixture comprising from about 3 to 8 weight percent of acrylic acid, from about 35 to 60 weight percent of a conjugated alkadiene monomer, and the balance up to 100 weight percent of any given such monomer mixture comprising at least one material selected from the group consisting of monovinyl aromatic compounds and alkene nitrile compounds. A minor amount of a surfactant is added to the monomer mixture before polymerization. These latices and methods for their preparation are described in the literature; see, for example, Bovey et al. "Emulsion Polymerization," published by Interscience Publishers, Inc. 1955 and Schildknecht in "Polymer Processes" published by Interscience Publishers, Inc. 1956. Optionally, such an emulsion may have chemically incorporated thereinto through polymerization a small quantity, say, less than about 2 weight percent based on total interpolymer weight, of a divinyl aromatic compound such as divinyl benzene, or the like.

Suitable monovinyl aromatic compounds include styrene (preferred); alkyl-substituted styrenes, such as ortho-, meta-, and para-methyl styrenes, 2,4-dimethyl styrene, para-ethylstyrene, or alphamethyl styrene; halogen substituted styrenes such as ortho-, meta-, and para-chlorostyrene, or bromostyrenes, 2,4-dichlorostyrene; and mixed halogen plus alkyl-substituted styrenes, such as 2-methyl-4-chlorostyrene; vinyl anthracene; mixtures thereof, and the like. The alkyl substituents generally have less than 5 carbon atoms, and may include isopropyl and isobutyl groups.

Suitable alkene nitrile compounds include acrylonitrile (preferred), methacrylonitrile, ethacrylonitrile, mixtures thereof, and the like.

Suitable conjugated alkadiene monomers include butadiene, 3-methyl-1,3-butadiene, 2-methyl-1,3-butadiene, piperylene chloroprene, mixtures thereof and the like. Conjugated 1,3-dienes are preferred.

Such a latex suitable for use in making a first composition for employment in the present invention can contain typically as made from about 30 to 70 parts by weight of total carboxylated alkadiene interpolymer with the balance up to 100 weight percent of a given latex being substantially water. Preferably, such a latex contains from about 45 to 60 parts by weight of such interpolymer.

To prepare a first composition of such dissolved water phenol-aldehyde resin and carboxylated alkadiene interpolymer, one simply mixes the respective materials together. As initially prepared, the resulting composition typically has a total solids content (combined weight of carboxylated alkadiene interpolymer and phenolformaldehyde resole resin) ranging from about 40 to 65 weight percent. Conveniently as prepared, the liquid phase of the resulting mixture is substantially entirely water.

In general, an individual cellulosic substrate used in the laminates of the present invention is an integral preformed sheetlike member composed substantially of cellulose fibers in a woven, nonwoven, or mixed structure. Typical thicknesses range from about 3 to 30 mils (under about 10 being preferred) Such members are well known to the art and include paper and cloth broadly; they need have no special characteristics. The cellulosic fibers used in such a substrate member can be of natural or synthetic origin and the sheet member can be in a woven or nonwoven state. Typical well-known sources for cellulose fibers include wood, cotton, and the like. Typically, average cellulosic fibers used in substrates employed in this invention have length to width ratios of at least about 2:1, and preferably about 6:1, with maximum length to width ratios being variable.

The term "substantially' as used herein in reference to cellulose fibers has reference to the fact that a substrate comprises mainly cellulose fibers with not more than about 5 to 10 percent of any given cellulosic substrate being other components, such as nonfibrous fillers, diluents, and the like, or fibrous noncellulosic materials, such as those derived from organic sources (e.g. protein, synthetic organic polymeric fibers like polyesters, etc.) or inorganic sources (e.g. silicious fibers or metallic fibers). Such other components when and if present, characteristically have size ranges which are not greater in magnitude than the cellulosic fibers. Preferably such other components are under 1 weight percent of the total weight of a starting individual cellulosic substrate member.

Particularly when high electrical properties are desired in a product laminate of the invention, the cellulosic substrate member should have a low ash content. Ash contents under 1 weight percent (based on total cellulosic substrate member weight) are preferred, and those having ash contents under 0.5 weight percent are more preferred.

Before a first composition is used for impregnation of a performed cellulosic substrate, it is convenient to dilute such composition organic liquid (as described above) so that the total solids concentration of such resulting composition typically ranges from about 5 to 40 weight percent (as indicated), with solids contents of 15 to 18 percent being preferred. A primary reason for adding such an organic liquid to such an aqueous composition mixture is to permit one to impregnate a preformed cellulosic substrate such as paper without causing a deterioration in the wet strength thereof effectuated. By adding in with the water such an organic solvent, the wet strength of a preformed cellulosic substrate material after impregnation and before drying to remove volatile liquid is maintained at acceptable and convenient processing levels for subsequent drying, advancing, etc. by machines, etc. of the resulting impregnated sheet before or during the process of making a laminate construction of the invention.

When a first composition is used to impregnate cellulosic fibers not yet formed into a substrate sheet of cellulosic material (woven or nonwoven) the first composition may not necessarily contain any such organic liquid, as when a first composition is added to paper pulp in the manufacture of paper on a Fourdrinier screen or the like.

In general, impregnation of a preformed substrate cellulosic member by a first composition can be accomplished by any conventional means, including spraying, dipping, coating, or the like, after which it is convenient and preferred to dry the so-treated sheet to remove residual volatile components and thereby leave an impregnated sheetlike construction. In drying, care is used to prevent leaving excessive volatiles in the impregnated sheet. In general a volatile level of less than 4 percent is desired.

For purposes of this invention, volatile level is determined by loss in weight after 10 minutes at 160° C., of the impregnated sheet. As indicated a so impregnated sheet member contains from about 5 to 40 weight percent of solids derived from first composition.

After a first impregnating procedure, the so-impregnated sheet member is secondly impregnated with a second composition comprising from about 30 to 70 weight percent (total composition basis) of a second dissolved resole resin, from about 0.5 to 15 weight percent (total composition basis) of dissolved water, and the balance up to 100 weight percent (total composition basis) being an organic liquid which (similarly):

1. is substantially inert,
2. evaporates below about 150° C., at atmospheric pressures, and
3. is a mutual solvent for said second resole resin and for said water (if present).

This second impregnation is carried out so that the resulting so second impregnated substrate contains from about 30 to 60 weight percent of said second composition (dry weight basis).

The second impregnation procedure using such second composition may be similar to the first impregnation procedure (when a preformed sheet is used), with care being used in the subsequent drying to prevent excessive advancing.

The second resole resin is a cresol formaldehyde resin and has an aldehyde to phenol (including cresol) mol ratio of from about 0.8 to 2.0 and is produced by reacting in the presence of a basic (preferably organic) catalyst under liquid aqueous phase conditions a mixture of cresol and phenol with formaldehyde. This second resole resin has a relatively high molecular weight as shown by the fact that it is substantially water insoluble but has an acetone solutility such that a 55 weight percent solution thereof can be prepared in acetone. Such acetone solution characteristically has an acetone dilutability of at least about 1:1. In addition, this resin has a free formaldehyde content which is less than about 5 weight percent. Preferably, the combined aldehyde to phenol (including cresol) ratio ranges from about 0.9 to 1.5. An organic basic catalyst is preferably used in preparation as indicated for the same reasons as explained above in reference to the first phenolic resin. The preparation of this resin is described below.

After such second resole resin is prepared, it is (conveniently) dehydrated or dried before being used to make an organic solution (varnish) for use as the second composition. Since the second resin is substantially water insoluble (as noted), the water is separatable therefrom by vacuum distillation after which the resin is dissolved in an organic liquid as solvent.

The organic liquid used has properties as indicated above. Mixtures of different organic liquids can be employed. Preferred liquids are lower alkanols (such as ethanol and methanol), and lower alkanones (such as acetone or methyl ethyl ketone). The term "lower" refers to less than 7 carbon atoms per molecule as used herein. Aromatic and aliphatic (including cycloaliphatic) hydrocarbons can also be employed, including cyclohexane, benzene, toluene, xylene, naphthalene, nonane, etc. Water can be present.

Those skilled in the art will appreciate that care must be taken when using this procedure to use an organic solvent liquid system in which both phenolic resins are soluble as well as water. Adding, for example, a ketone or an ether-ester solvent like butyl cellosolve improves the water tolerance (ability to dissolve water) of a solvent system.

In general, the second resole resin solids content of a resin composition for use in this invention can vary over a wide range, as indicated, but the optimum solids content for a given use situation is conveniently controlled by the conditions and equipment employed for application and by the type of laminate product desired.

In general, to produce a second composition of resole resin for use in this invention, a mixture of a cresol and phenol is prepared which contains from about 20 to 100 weight percent of cresol with the balance up to 100 weight percent in any given such mixture being phenol. The cresols of commerce typically contain a mixture of the three different isomers of cresol. This mixture is added to from about 0.8 to 2.0 mols of formaldehyde per one mol of phenol (including cresol) mixture. Also, a catalyst (preferably organic), such as hexamethylenetetramine, triethylamine, mixtures thereof, or the like, is then heated to temperatures of about 100° C. for a time sufficient to produce an aqueous thermosettable second resole resin having the above-indicated properties.

Such a second cresol-formaldehyde resole resin is partially or completely dehydrated as indicated above before being used to make a second composition for use in this invention.

To prepare a liquid second composition for use in this invention, one can conveniently dissolve a dehydrated or partially dehydrated liquid second resole resin (described above) in an inert, relatively volatile organic solvent as indicated above. Suitable solvents include alcohols, such as lower alkanols, like ethanol and methanol, ketones such as di(lower alkyl) ketones like methyl ethyl ketone and mixed alkyl aromatic liquids synthesized from petroleum hydrocarbons. Preferred solvents are lower alkanols. The water content of a varnish of this invention can range as high as about 15 weight percent, but preferably is below about 10 weight percent, and more preferably falls in the range of from about 0.5 to 5 weight percent.

These liquid second compositions are characteristically dark colored, one-phase, clear liquids having a viscosity ranging from about 50–5,000 centipoises (preferably about 50 to 500 centipoises). As those skilled in the art will appreciate, the second compositions of this invention can be advanced to a greater extent without forming precipitates from the organic solvent phase than is the case of corresponding aqueous resole resin systems.

To use a cellulosic substrate which has been first and secondly impregnated as described above for the manufacture of laminates, it is preferred to employ such a intermediate sheet member which has been advanced to an extent such that it has a flow of from about 3 to 20 percent, (preferably from about 5 to 15 percent). To so advance a sheet member to such a flow it is convenient to heat in air such an intermediate sheet to temperatures in the range of from about 30° to 180° C., for time sufficient to advance same to the so-desired extent.

It will be appreciated that such an advancement can be conveniently accomplished while residual volatile materials are being removed in a drying operation after impregnation, as indicated above.

Intermediate sheet like members of this invention, whether advanced to the extent indicated or not, are generally at least about 4 mils thick and can be as thick as 20 mils, though thicknesses not more than about 10 mils are preferred.

The density of an individual intermediate sheetlike member is relatively unimportant since the laminate, as described below, is formed under heat and pressure conditions which generally solidify all components together into an integral solid nonporous mass.

To make a laminate construction of this invention one forms: at least one sheetlike member (preferably advanced as described above) into a layered configuration which is at least to layers thick with adjoining layers being substantially in face-to-face engagement. As those skilled in the art will appreciate, an individual laminate construction of the invention can comprise a series of different impregnated cellulosic substrate members at least one of which is an intermediate sheetlike member of this invention or it can comprise a series of similar such intermediate members depending upon properties desired in the product laminate.

Such a layered configuration is then subjected to pressures in the range of from about 50 to 2000 p.s.i. while maintaining temperatures in the range of from about 120° to 180° C., for a time sufficient to substantially completely thermoset the composite and thereby produce a desired laminate. Preferably, the laminate is pressed at 140°–160° C., at 500–1,500 p.s.i. for 15–60 minutes. It is preferred to use sheet members of this invention as the sole components of the laminate.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of second impregnating compositions suitable for use in this invention are prepared as in table I below. In these examples the phenol-cresol resole resin used in each instance has an aldehyde to phenol-cresol ratio of from about 0.8 to 2.0, is produced by reacting under aqueous liquid phase conditions formaldehyde and a phenol-cresol mixture in the presence of an organic basic catalyst, is substantially insoluble in water but soluble in acetone to an extent that a 55 weight percent solution thereof in acetone can be prepared, and has a free formaldehyde content of less than about 5 1 weight percent.

EXAMPLES A–E

Phenol-cresol resole resins are prepared as follows:

Measured amounts of phenol, cresol, hexamethylenetetramine, and formalin, respectively, are charged to a reactor and the resulting mixture is heated to 90° C., until a resin is formed. The reaction product typically has a 60 percent resin solids content. This reaction product in each instance is vacuum stripped to remove almost all water and other volatile components and the residue is dissolved in ethanol to produce a varnish having a viscosity in the rage of from 200 to 500 centipoises. Each product varnish has a water content of from about 2 to 4 weight percent (based on total varnish weight). The results are tabulated in Table I.

TABLE I

| Ex. | Phenol | Cresol | Hexa-methylene-tetramine | For-malin [1] | Reflux temp., ° C. | Solvent |
|---|---|---|---|---|---|---|
| A | 80 | 20 | 3 | 70 | 90 | Ethanol. |
| B | 60 | 40 | 3 | 70 | 90 | Do. |
| C | 40 | 60 | 3 | 70 | 90 | Do. |
| D | 20 | 80 | 3 | 70 | 90 | Do. |
| E | 0 | 100 | 3 | 70 | 90 | Do. |

[1] Formalin is 50% solution of formaldehyde in water.

EXAMPLE F

A reaction vessel is charged with phenol (100 parts), cresylic acid (33.3 parts), 50 percent formalin (88.8 parts) and hexamethylenetetramine (3.84 parts). After refluxing at 90° C., for 2.6 hours, the resin is vacuum stripped to remove water. To the resin was added ethanol (70 parts), Abalyn (10.7 parts) and 60 percent rosin solution (26.7 parts). A 58.9 percent solids solution was obtained having a viscosity of 281 centipoises.

Examples of first impregnating compositions suitable for use in this invention are prepared as follows:

EXAMPLES G

A water soluble resole resin of phenol and formaldehyde is prepared as follows: Phenol (100 parts), 50 percent formalin (111 parts) and triethylamine (5 parts) are charged to a vessel. After reacting at about 70° C., until the mixtures free formaldehyde content is less than about 4 percent, the mixture is cooled. The resin product contains about 55 percent solids dissolved in water

EXAMPLE H

A latex comprising styrene, butadiene and about 4-6 weight percent acrylic acid and having about 48 percent by weight solids colloidally dispersed in an aqueous medium is commercially available from Dow Chemical Co., as Dow 636 latex.

EXAMPLE I

A pressure vessel is charged with water (140 parts), styrene (45 parts), butadiene (50 parts), acrylic acid (5 parts), Triton X-770 (2 parts), Triton X-100 (1 parts), sodium bisulfite (0.10 part) and potassium persulfate (0.25 part). The persulfate and bisulfite are added incrementally during the reaction. After heating at 50° C., for 30 hours, the latex is vacuum-stripped to 50 percent solids.

EXAMPLE J

A pressure vessel is charged with water (140 parts), acrylonitrile (25 parts), butadiene (70 parts), acrylic acid (5 parts), Nekal BX (3 parts), sodium pyrophosphate (0.3 part), sodium bisulfite (0.1 part) and potassium persulfate (0.25 part). The persulfate and bisulfite are added incrementally during the reaction. After heating at 50° C., for 22 hours, the latex is vacuum-stripped to 50 percent solids.

Examples of impregnating compositions of resole resin an carboxylated alkadiene interpolymer suitable for use in this invention are:

EXAMPLES K-P

To prepare first impregnating compositions of this invention, a specific resole resin and a specific interpolymer are simply mixed together with stirring. table II below gives examples of these compositions prepared from Examples G-J

TABLE II

| Treating composition | Resole Ex. No | Amount | Carboxylated Alkadiene Ex. No. | Interpolymer amount |
|---|---|---|---|---|
| K | G | 60 | H | 40 |
| L | G | 60 | I | 40 |
| M | G | 60 | J | 40 |
| N | G | 50 | H | 50 |
| O | G | 40 | I | 60 |
| P | G | 40 | J | 60 |

Examples of intermediate sheetlike members of this invention are prepared as follows:

EXAMPLES 1-14

Samples of preformed cellulosic substrate types are chosen as follows:

Type 1: Nonwoven cotton linters paper, about 10 mils in thickness.

Type 2: Nonwoven unbleached Kraft paper, about 7 mils in thickness.

Type 3: Nonwoven and cellulose paper, about 10 mils in thickness.

Type 4: Nonwoven bleached Kraft paper about 15 mils in thickness.

Type 5: Woven cotton duck cloth about 8 oz. weight.

Type 6: Woven linen cloth about 4-oz. weight.

All types have an ash content less than about 0.9 weight percent.

The impregnation procedure for twice impregnating each above substrate type is follows: Preformed cellulosic sheets are passed through the first impregnating solution, drawn between squeeze rolls to remove excess resin and hung in an oven at 135° C. for drying to a volatile content of less than 2 percent. Volatile content is the loss of weight of the dried impregnated sheet after exposure to 160° C., for 10 minutes. A resin content of 25 percent is thus obtained in each sample sheet so treated (or otherwise as shown in table III below).

Next, the so first impregnated sheets obtained above are passed through the second impregnating resin solution, drawn between squeeze rolls and dried in a 135° C. oven to obtain a resin content (total) of 60 percent and a flow of 5 percent.

For purposes of this invention, flow of a green resin sheet is determined by the following procedure.

From an impregnated sample sheet, 6-2 inch diameter discs are cut and assembled together in deck fashion in face-to-face engagement. Then, to opposed faces of the resulting deck there is applied about 1,000 p.s.i. pressure using 150° C. for 5 minutes. Thereafter, the discs are cooled and any resin which has exuded from the discs is removed by abrasion, scraping, or the like. The difference in weight between the green sandwich and the pressed sandwich is flow.

The volatile content of each such sheet is less than about 5 percent. The results are summarized in table III below.

TABLE III

| Ex. No. | Preformed sheet type | Pretreat resin Type | Pretreat resin content in sheet[1] | Overtreat resin Type | Overtreat resin content in sheet[1] | Percent flow in production sheet |
|---|---|---|---|---|---|---|
| 1 | 1 | N | 23 | F | 59 | 4 |
| 2 | 2 | N | 26 | F | 58 | 5 |
| 3 | 3 | N | 24 | F | 58 | 4 |
| 4 | 4 | N | 25 | F | 61 | 6 |
| 5 | 5 | N | 25 | F | 60 | 7 |
| 6 | 6 | N | 25 | F | 60 | 6 |
| 7 | 1 | O | 24 | F | 61 | 5 |
| 8 | 1 | P | 25 | F | 59 | 5 |
| 9 | 1 | K | 25 | F | 59 | 4 |
| 10 | 1 | N | 23 | A | 57 | 7 |
| 11 | 1 | N | 26 | B | 58 | 5 |
| 12 | 1 | N | 26 | C | 59 | 5 |
| 13 | 1 | N | 24 | D | 62 | 6 |
| 14 | 1 | N | 25 | E | 60 | 5 |

[1] Dry weight basis.

Examples of laminates of this invention are prepared as follows:

EXAMPLES 15-24

Using the intermediate sheetlike members prepared in Examples 1-14, laminates are prepared The lamination procedure involves the steps of first assembling a prechosen plurality of intermediate sheetlike members into a deck or sandwich and then applying to the opposed exposed faces of the resulting deck appropriate heat and pressure for a time sufficient to substantially completely cure the impregnated resins and produce the desired laminates. These laminates have excellent cold punchability and electrical characteristics. The details are summarized in table IV below:

TABLE IV

| Example Number | Impreg. cellulosic sheet members as described in Ex. No. | No. of layers used | Laminate forming conditions | | |
|---|---|---|---|---|---|
| | | | Pressure, p.s.i. | Tempera- ture, °C. | Time, min. |
| 15 | 1 | 8 | 1,000 | 140 | 30 |
| 16 | 1 | 8 | 1,000 | 160 | 30 |
| 17 | 2 | 10 | 1,000 | 160 | 30 |
| 18 | 3 | 8 | 1,000 | 150 | 30 |
| 19 | 4 | 8 | 1,000 | 140 | 45 |
| 20 | 7 | 8 | 1,000 | 150 | 30 |
| 21 | 8 | 8 | 1,000 | 150 | 30 |
| 22 | 9 | 8 | 1,000 | 150 | 30 |
| 23 | 13 | 8 | 1,000 | 150 | 30 |
| 24 | 14 | 8 | 1,000 | 150 | 30 |

EXAMPLE 25

A series of 10 mil cotton linters paper are immersed in the resin solution of Example G diluted with isopropanol/water mixture. Another series of paper are immersed in the resin solution of Example N. Both series of papers are drawn between squeeze rolls and then dried in an oven at 135° C. for 15 minutes to obtain about 1.3 percent volatile level. Each of the dried papers is immersed in the resin solution of Example F and then drawn between squeeze rolls and dried in an oven at 135° C. until a flow of between 5 an 10 percent was obtained. Each series of paper was stacked and heated in a press at 140° C. and at 160° C. for a period of 30 minutes and at a pressure of 1,000 p.s.i. to form a laminate one-sixteenth inch thick. Various properties of the test laminates are given in table V.

TABLE V

| Pretreat (resin content) | Overtreat | Cure temp. | Cold punch | Water abs. | DC | DF | Cold flow |
|---|---|---|---|---|---|---|---|
| Resin of Example G (15%) | Resin of Example F | 140 | Cracks | 0.45 | 4.7 | .010 | 1.2 |
| | | 160 | do | 0.91 | 4.8 | .040 | 0.6 |
| Resin of Example N (23%) | do | 140 | No cracks | 0.47 | 4.3 | .037 | 1.1 |
| | | 160 | do | 0.91 | 4.6 | .041 | 0.9 |

What is claimed is:

1. An intermediate sheetlike member adapted for use in the manufacture of cold punchable laminates comprising:
   A. a substrate comprising cellulosic fibers arranged into a generally integral sheetlike form,
   B. said substrate being first impregnated with a first composition comprising (dry weight basis) from about 35 to 65 weight percent of a water-soluble phenol-formaldehyde resole resin and the balance up to 100 weight percent of said first composition being carboxylated alkadiene interpolymer comprising a polymerized monomer mixture of from about 3 to 8 weight percent acrylic acid, from about 35 to 60 weight percent of a conjugated alkadiene monomer, and the balance up to 100 weight percent comprising at least one material selected from the group consisting of monovinyl aromatic compounds and alkene nitrile compounds such that said so-first-impregnated substrate contains from 5 to 40 weight percent of said first composition (dry weight basis),
   C. said substrate being secondly impregnated with a second composition comprising a cresol-phenol-formaldehyde resole resin such that said so-second-impregnated substrate contains from about 30 to 60 weight percent of said second composition (dry weight basis),
   D. said cresol-phenol-formaldehyde resole resie being characterized by:
      1. having an aldehyde to (theoretical) phenol ratio of from about 0.8 to 2.0,
      2. being produced by reacting under aqueous liquid phase conditions formaldehyde and cresol-phenol mixture in the presence of an organic basic catalyst,
      3. said cresol-phenol mixture comprising from about 20 to 100 weight percent of cresol with the balance up to 100 weight percent of any given such mixture being phenol,
      4. being substantially insoluble in water but having an acetone solubility such that a 55 weight percent solution thereof in acetone can be prepared, and
      5. having a free formaldehyde content which is less than about 5 weight percent.

2. A sheetlike member of claim 1 which has been heated to temperatures in the range of from about 30° to 180° C. for a time sufficient to advance said composition to an extent such that said member has a flow of from about 3 to 20 percent.

3. A cold punchable laminate construction prepared by the steps of:
   A. forming at least one sheetlike member of claim 2 into a layered configuration which is at least two layers thick with adjoining layers being substantially in face-to-face engagement, and
   B. subjecting the so-resulting layered configuration to pressures in the range of from about 50 to 2,000 p.s.i. while maintaining temperatures in the range of from about 120° to 180° C. for a time sufficient to substantially completely thermoset both said first composition and said second composition and thereby produce a desired laminate.

4. In a process for making an intermediate sheetlike member adapted for use in the manufacture of cold punchable laminates using as a starting material a substrate of cellulosic fibers arranged into a generally integral sheetlike form which has been first impregnated with a first composition comprising (dry weight basis) from about 35 to 65 weight percent of a water-soluble phenol-formaldehyde resole resin and the balance up to 100 weight percent of said first composition being a carboxylated alkadiene interpolymer comprising a polymerized monomer mixture of from about 3 to 8 weight percent acrylic acid, from about 35 to 60 weight percent of a conjugated alkadiene monomer, and the balance up to 100 weight percent comprising at least one material selected from the group consisting of monovinyl aromatic compounds and alkene nitrile compounds such that said so-first-impregnated substrate contains from about 5 to 40 weight percent of said first composition, the improvement which comprises the steps of:

A. secondly impregnating a said so-first-impregnated laminate with a second composition comprising from about 30 to 70 weight percent (total composition basis) of a dissolved cresol-phenol-formaldehyde resole resin from about 0.5 to 15 weight percent (total composition basis) of dissolved water, and the balance up to 100 weight percent (total composition basis) being an organic liquid which:
      1. is substantially inert,
      2. evaporates below about 150° C. at atmospheric pressures, and
      3. is a mutual solvent for said cresol-phenol-formaldehyde resole resin and for said water, to an extent such that the resulting so-impregnated substrate contains from about 30 to 70 weight percent of said second composition (dry weight basis),
   B. said cresol-phenol-formaldehyde resole resin being characterized by:
      1. having an aldehyde to (theoretical) phenol ratio of from about 0.8 to 2.0,
      2. being produced by reacting under aqueous liquid phase conditions formaldehyde and a cresol-phenol-mixture in the presence of an organic basic catalyst, 3. said cresol-phenol mixture comprising from about 20 to 100 weight percent of cresol with the balance up to 100 weight percent of any given such mixture being phenol, 4. being substantially insoluble in water but having an acetone solubility such that a 55 weight percent solution thereof in acetone can be prepared, and 5. having a free formaldehyde content which is less than about 5 weight percent 5. A process for making an intermediate sheetlike member adapted for use in the manufacture of cold punchable laminates comprising the steps of:

A. first impregnating a substrate comprising cellulosic fibers arranged into a generally integral sheetlike form, with a first composition comprising from about 5 to 40 weight percent (total composition basis) of a mixture comprising a first dissolved water soluble phenol-formaldehyde resole resin and an aqueous phase colloidially dispersed carboxylated alkadiene interpolymer comprising a polymerized monomer mixture of from about 3 to 8 weight percent acrylic acid, from about 35 to 60 weight percent of a conjugated alkadiene monomer, and the balance up to 100 weight percent comprising at least one material selected from the group consisting of monovinyl aromatic compounds and alkene nitrile compounds, from about 5 to 100 weight percent water, and the balance up to 100 weight percent of any given first composition being an organic liquid which:

1. is substantially inert
2. evaporates below about 150° C. at atmospheric pressure, and
3. is a mutual solvent for said first resole resin and said water, said mixture comprising (dry weight basis) from about 35 to 65 weight percent of said first resole resin and the balance up to 100 weight percent of a given mixture being said carboxylated alkadiene interpolymer to an extent such that the resulting so impregnated substrate contains from about 5 to 40 weight percent of said first composition (dry weight basis), B. secondly impregnating a said so-first-impregnated laminate with a second composition comprising from about 30 to 70 weight percent (total composition basis) of a second dissolved resole resin, from about 0.5 to 15 weight percent (total composition basis) of dissolved water, and the balance up to 100 weight percent (total composition basis) being an organic liquid which:

1. is substantially inert,
2. evaporates below about 150° C. at atmospheric pressures, and
3. is a mutual solvent for said second resole resin and for said water (if present), to an extent such that the resulting so-impregnated substrate contains from about 30 to 70 weight percent of said second composition (dry weight basis), C. said second dissolved resole resin being derived from cresol, phenol, and formaldehyde and being characterized by:

1. having an aldehyde to (theoretical) phenol ratio of from about 0.8 to 2.0,
2. being produced by reacting under aqueous liquid phase conditions formaldehyde and a cresol-phenol mixture in the presence of an organic basic catalyst,
3. said cresol-phenol mixture comprising from about 20 to 100 weight percent of cresol with the balance up to 100 weight percent of any given such mixture being phenol,
4. being substantially insoluble in water but having an acetone solubility such that a 55 weight percent solution thereof in acetone can be prepared, and
5. having a free formaldehyde content which is less than about 5 weight percent.

6. In a process for making a laminate construction using a sheetlike member of the type described in claim 1, the improvement which comprises the steps of A. heating at least one such sheetlike member at temperatures in the range of from about 30° to 180° C. for a time to advance some to an extent such that the resulting sheetlike member has a flow of from about 3 to 20 percent, B. forming at least one such so-advanced sheetmember into a layered configuration at least two layers thick with adjoining layers being substantially in face-to-face engagement, C. subjecting the resulting layered configuration to pressures in the range of from about 50 to 2,000 p.s.i. while maintaining temperatures in the range of from about 120° to 180° C. for a time sufficient to substantially completely thermoset said composition and thereby produce a desired laminate construction.

7. A process for making a laminate construction using a sheetlike member of the type described in claim 2 comprising the steps of A. forming at least one such sheetlike member into a layered configuration at least two layers thick with adjoining layers being substantially in face-to-face engagement, and B. subjecting the resulting layered configuration to pressures in the range of from 50 to 2,000 p.s.i. while maintaining temperatures in the range of from about 120° to 180° C. for a time sufficient to substantially completely thermoset said composition and thereby produce a desired laminate construction.

* * * * *